United States Patent
Wood et al.

(10) Patent No.: US 11,924,511 B2
(45) Date of Patent: Mar. 5, 2024

(54) SMART REMOTE CONTROL FOR AUDIO RESPONSIVE MEDIA DEVICE

(71) Applicant: Roku, Inc., Los Gatos, CA (US)

(72) Inventors: Anthony Wood, Palo Alto, CA (US); Lloyd Klarke, Sunnyvale, CA (US)

(73) Assignee: Roku, Inc., San Jose, CA (US)

( * ) Notice: Subject to any disclaimer, the term of this patent is extended or adjusted under 35 U.S.C. 154(b) by 8 days.

(21) Appl. No.: 16/566,513

(22) Filed: Sep. 10, 2019

(65) Prior Publication Data
US 2020/0112700 A1 Apr. 9, 2020

Related U.S. Application Data (60) Provisional application No. 62/741,060, filed on Oct. 4, 2018.

(51) Int. Cl.
*H04N 21/422* (2011.01)
*G06F 3/01* (2006.01)
(Continued)

(52) U.S. Cl.
CPC .............. *H04N 21/47* (2013.01); *G06F 3/011* (2013.01); *G06F 3/017* (2013.01); *G06F 3/167* (2013.01);
(Continued)

(58) Field of Classification Search
CPC ............. H04N 21/47; H04N 21/42203; H04N 21/42222; H04N 21/485; G06F 3/011; G06F 3/017; G06F 3/167
(Continued)

(56) References Cited

U.S. PATENT DOCUMENTS 9,830,924 B1 * 11/2017 Degges, Jr. ............... H04R 3/00
9,898,250 B1    2/2018 Williams et al.
(Continued)

FOREIGN PATENT DOCUMENTS

KR    10-2014-0023169 A    2/2014

OTHER PUBLICATIONS

International Search Report and Written Opinion of the International Searching Authority directed to related International Patent Application No. PCT/US2019/053992, dated Jan. 29, 2020; 10 pages.

(Continued)

*Primary Examiner* — John W Miller
*Assistant Examiner* — Omer Khalid
(74) *Attorney, Agent, or Firm* — Sterne, Kessler, Goldstein & Fox P.L.L.C.

(57) ABSTRACT

Disclosed herein is a battery operated, audio responsive remote control for controlling a media device. The remote control includes a speaker, microphone and talk button. The remote control is configured to: detect the talk button being pressed; responsive to the detection and within a time period that commences from the detection, analyze audio data received via the microphone to recognize one or more audio commands; and process the recognized audio commands. The remote control is also configured to: determine a volume level of the received audio data; and audibly confirm the recognized audio commands at the determined volume level. According to some embodiments, the remote control also includes a motion sensor, and is configured to: detect motion of the remote control using the motion sensor; determine that the detected motion corresponds to a volume changing motion; and adjust volume of the remote control and/or a media device according to the volume changing motion.

20 Claims, 4 Drawing Sheets

(51) Int. Cl.
  *G06F 3/16* (2006.01)
  *H04N 21/47* (2011.01)
  *H04N 21/485* (2011.01)
(52) U.S. Cl.
  CPC . *H04N 21/42203* (2013.01); *H04N 21/42222* (2013.01); *H04N 21/485* (2013.01)
(58) Field of Classification Search
  USPC .......................................... 704/275; 348/734
  See application file for complete search history.

(56) References Cited

U.S. PATENT DOCUMENTS

| | | | |
|---|---|---|---|
| 2006/0235701 A1 | 10/2006 | Cane et al. | |
| 2009/0248413 A1 | 10/2009 | Liu et al. | |
| 2013/0300651 A1* | 11/2013 | Lim | G06F 3/03 345/156 |
| 2014/0081630 A1* | 3/2014 | Jung | H03G 3/301 704/225 |
| 2014/0363024 A1* | 12/2014 | Apodaca | H04R 27/00 381/109 |
| 2014/0372109 A1* | 12/2014 | Iyer | H03G 3/3089 704/225 |
| 2015/0206529 A1* | 7/2015 | Kwon | G10L 15/22 704/246 |
| 2017/0048615 A1* | 2/2017 | Son | G10L 19/167 |
| 2018/0033424 A1 | 2/2018 | Pechanec et al. | |
| 2018/0349093 A1* | 12/2018 | McCarty | G10L 13/033 |
| 2019/0149584 A1* | 5/2019 | DiBello | H04N 21/8126 709/204 |

OTHER PUBLICATIONS

Supplementary European Search Report directed to related European Application No. 19868969.7, dated May 19, 2022; 8 pages.

* cited by examiner

SMART REMOTE CONTROL FOR AUDIO RESPONSIVE MEDIA DEVICE

CROSS REFERENCE TO RELATED APPLICATIONS

This application claims priority to U.S. Provisional Application No. 62/741,060 filed Oct. 4, 2018, and is related to U.S. patent application Ser. No. 15/341,552 titled "Improved Reception Of Audio Commands," filed Nov. 2, 2016; U.S. patent application Ser. No. 15/646,379 titled "Controlling Visual Indicators In An Audio Responsive Electronic Device, and Capturing and Providing Audio Using an API, By Native and Non-Native Computing Devices and Services," filed Jul. 11, 2017; and U.S. patent application Ser. No. 15/895,047 titled "Trigger Word Detection With Multiple Digital Assistants," filed Feb. 13, 2018, all of which are herein incorporated by reference in their entireties.

BACKGROUND

Field

This disclosure is generally directed to a media device, and more particularly to an audio responsive, smart remote control for a media device.

Background

Media devices exist that are responsive to voice commands from users. Such media devices include, for example, personal assistants such as Siri™ and Alexa™ (as well as their related devices such as the Apple iPhone™ and Amazon Echo™). Typically, such audio responsive media devices recognize user voice commands by listening for a wake word, such as "Hello Siri" or "Hello Alexa."

But there are technical challenges with this approach. For example, conventional audio responsive media devices must listen for wake words in environments containing other sounds (such as TV audio, music, human conversation, noise, etc.), thereby reducing the accuracy of wake word identification. Also, users must be located relatively close to the audio responsive media device for their audio commands to be heard and processed, and this proximity requirement may detract from the user's experience in some circumstances. Further, conventional audio responsive media devices must continuously listen for wake words, and this represents a power drain that is especially detrimental for battery operated devices.

SUMMARY

Provided herein are system, apparatus, article of manufacture, method and/or computer program product embodiments, and/or combinations and sub-combinations thereof, for an audio responsive, smart remote control for a media device.

In an example embodiment, a battery operated, audio responsive remote control includes a speaker, microphone and talk button. The remote control is configured to: detect the talk button being pressed; responsive to the detection and within a listen time period that commences from the detection, analyze audio data received via the microphone to recognize one or more audio commands; and process the recognized audio commands.

The remote control is also configured to: determine a volume level of the received audio data; and audibly confirm the recognized audio commands at the determined volume level.

The remote control is further configured to: request content from a content server; receive the requested content from the content server; and cause the received content to be played on the remote control and/or a media device at the determined volume level According to some embodiments, the remote control also includes a motion sensor, and is configured to: detect motion of the remote control using the motion sensor; determine that the detected motion corresponds to a volume changing motion; and adjust volume of the remote control and/or a media device according to the volume changing motion.

BRIEF DESCRIPTION OF THE FIGURES

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Figure 1:
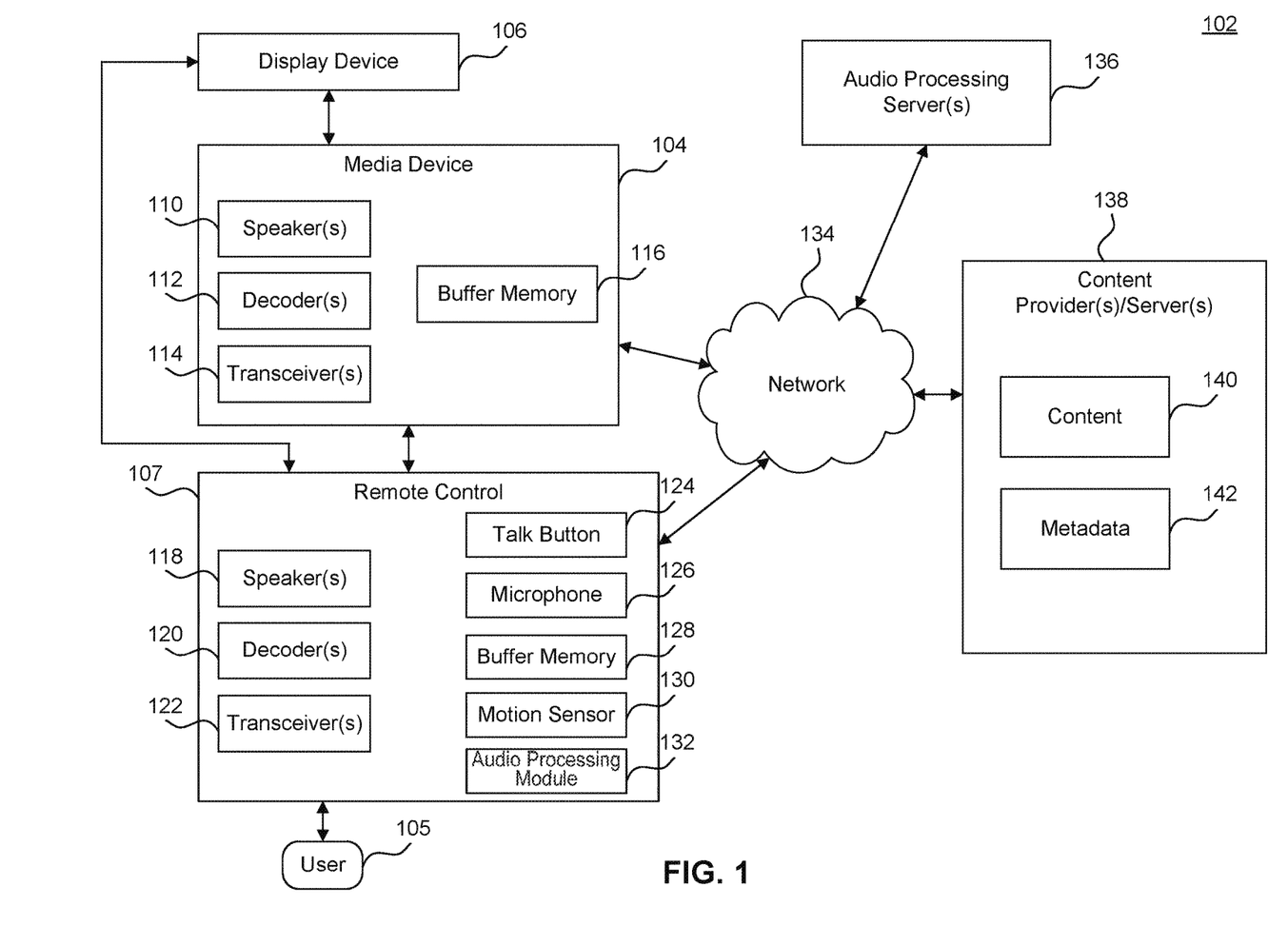
FIG. 1 illustrates a block diagram of a multimedia environment, according to some embodiments.

FIG. 1 illustrates a block diagram of a multimedia environment 102, according to some embodiments. In a non-limiting example, multimedia environment 102 is directed to streaming media such as movies, TV shows, games, audio books, and music, to name just some examples.

The multimedia environment 102 may include one or more media devices 104. In an embodiment, media device 104 is a speaker. However, this disclosure is not limited to that example embodiment. In other embodiments, the media device 104 may be a streaming media device, DVD device, audio/video playback device, cable box, appliance, internet of things (IoT) device, and/or digital video recording device, to name just a few examples.

Media device 104 may include one or more speakers 110, one or more audio and video decoders 112, one or more transceivers 114 and buffer memory 116. In some embodiments, the media device 104 responds to audio commands from users 105 and, accordingly, includes a microphone to receive audio data (not shown in FIG. 1). In other embodiments, the media device 104 is not audio responsive and does not include a microphone.

In some embodiments, media device 104 may be coupled to a display device 106. Display device 106 may be a monitor, television, computer, smart phone, tablet, wearable (such as a watch), and/or projector, to name just a few examples. In some embodiments, media device 104 can be a part of, integrated with, operatively coupled to, and/or connected to its respective display device 106.

Each media device 104 may be configured to communicate with network 134. In various embodiments, the network 134 can include, without limitation, wired and/or wireless intranet, extranet, Internet, cellular, Bluetooth and/or any other short range, long range, local, regional, global communications network, as well as any combination thereof.

The multimedia environment 102 may include one or more content servers 138 (also called content providers 138). Each content server 138 may be configured to communicate with network 134.

Each content server 138 may store content 140 and metadata 142. Content 140 may include any combination of music, videos, movies, TV programs, multimedia, images, still pictures, text, graphics, gaming applications, advertisements, programming content, public service content, government content, local community content, software, and/or any other content or data objects in electronic form.

Metadata 142 may include data about content 140. For example, metadata 142 may include associated or ancillary information indicating or related to writer, director, producer, composer, artist, actor, summary, chapters, production, history, year, trailers, alternate versions, related content, applications, and/or any other information pertaining or relating to the content 140. Metadata 142 may also or alternatively include links to any such information pertaining or relating to the content 140. Metadata 142 may also or alternatively include one or more indexes of content 140, such as but not limited to a trick mode index.

Users 105 may interact with the media device 104 and/or the display device 106 using, for example, a remote control 107. The remote control 107 can be any component, part, apparatus and/or method for controlling the media device 104 and/or display device 106, such as a remote control, a tablet, laptop computer, smartphone, wearable, on-screen controls, integrated control buttons, audio controls, or any combination thereof, to name just a few examples. In some embodiments, the remote control 107 is battery operated. Users 105 may use the remote control 107 to interact with the media device 104 and/or display device 106 to select and playback content, such as a movie, TV show, music, book, application, game, etc.

Remote control 107 may be considered a smart remote control given its functionality described herein.

Remote control 107 may be audio responsive and respond to audio commands spoken by users 105 and/or audibly output by devices in the multimedia environment 102, such as the display device 106. Accordingly, remote control 107 may include a microphone 126 for receiving audio data.

Remote control 107 may also include one or more speakers 118, one or more audio and video decoders 120, one or more transceivers 122, a talk button 124, buffer memory 128, a motion sensor 130, and/or an audio processing module 132. The remote control 107 may include other components, such as one or more processors or other control hardware for performing the functions described herein.

Each audio decoder 112, 120 in the media device 104 and remote control 107 may be configured to decode audio of one or more audio formats, such as but not limited to AAC, HE-AAC, AC3 (Dolby Digital), EAC3 (Dolby Digital Plus), WMA, WAV, PCM, MP3, OGG GSM, FLAC, AU, AIFF, and/or VOX, to name just some examples.

Each video decoder 112, 120 in the media device 104 and remote control 107 may be configured to decode video of one or more video formats, such as but not limited to MP4 (mp4, m4a, m4v, f4v, f4a, m4b, m4r, f4b, mov), 3GP (3gp, 3gp2, 3g2, 3gpp, 3gpp2), OGG (ogg, oga, ogv, ogx), WMV (wmv, wma, asf), WEBM, FLV, AVI, QuickTime, HDV, MXF (OP1a, OP-Atom), MPEG-TS, IMPEG-2 PS, MPEG-2 TS, WAV, Broadcast WAV, LXF, GXF, and/or VOB, to name just some examples. Each video decoder 112, 120 may include one or more video codecs, such as but not limited to H.263, H.264, HEV, MPEG1, MPEG2, MPEG-TS, MPEG-4, Theora, 3GP, DV, DVCPRO, DVCPRO, DVCProHD, IMX, XDCAM HD, XDCAM HD422, and/or XDCAM EX, to name just some examples.

The multimedia environment 102 may include one or more audio processing server(s) 136. Each audio processing server 136, as well as the audio processing module 132 in the remote control 107, may be configured to receive audio data, and to recognize wake words as well as audio commands contained in the received audio data. Examples of recognizing wake words are described in U.S. patent application Ser. No. 15/895,047 titled "Trigger Word Detection With Multiple Digital Assistants," filed Feb. 13, 2018; and U.S. patent application Ser. No. 15/341,552 titled "Improved Reception Of Audio Commands," filed Nov. 2, 2016, which are herein incorporated by reference in their entireties.

Figure 2:
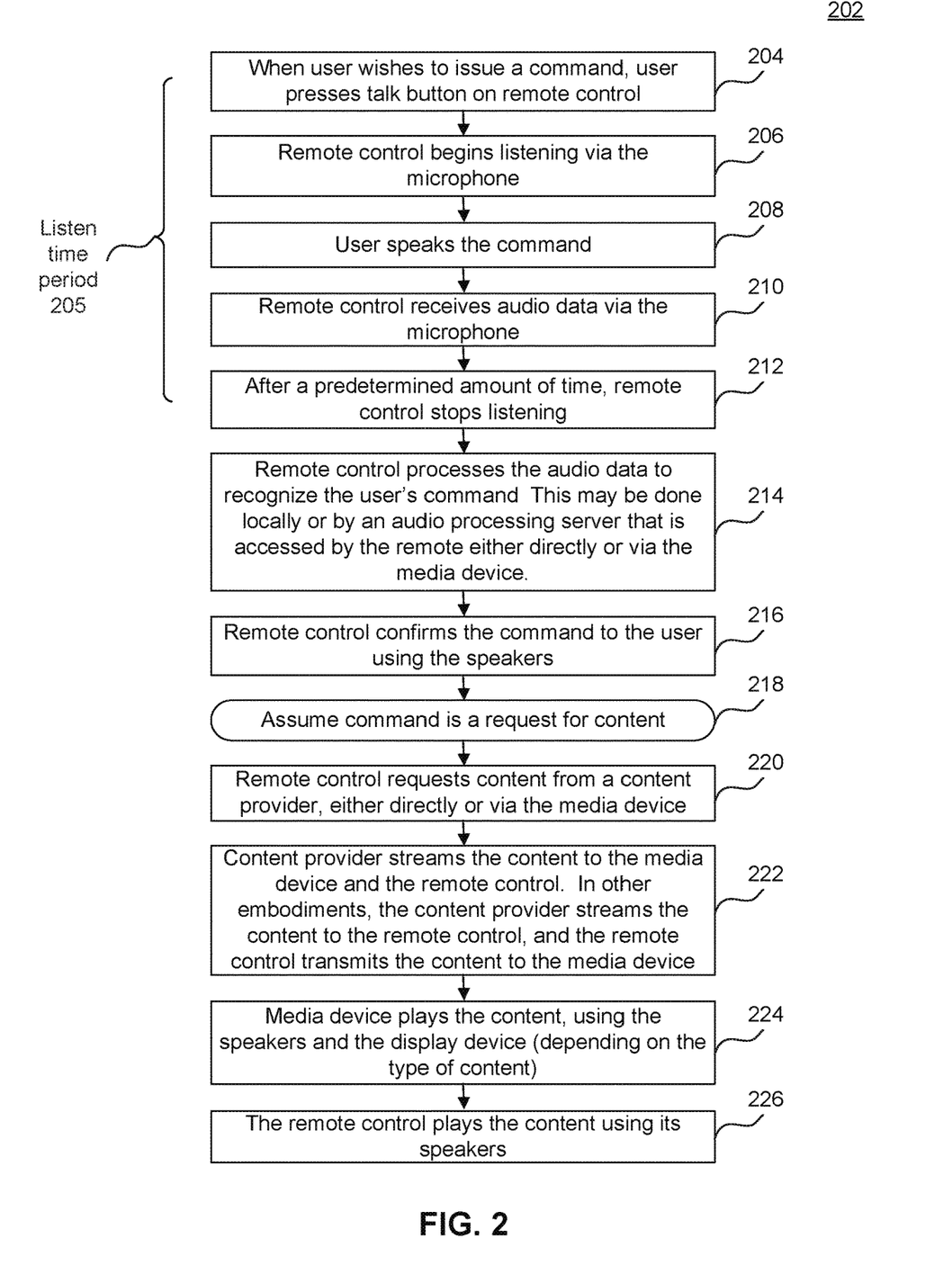
FIG. 2 illustrates a flowchart for operating a media device using an audio responsive, smart remote control, according to some embodiments.

FIG. 2 is a flowchart of a method 202 for operating a media device using a smart remote control. In some embodiments, the smart remote control is audio responsive and the media device is not audio responsive. In other words, the smart remote control is configured to respond to audio commands, and the media device is not configured to respond to audio commands. Method 202 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 2, as will be understood by a person of ordinary skill in the art. Method 202 shall be described with reference to FIG. 1. However, method 202 is not limited to that example embodiment.

In 204, the user 105 may press the talk button 124 on the remote control 107 to indicate his intent to speak an audio command to the media device 104. But, according to some embodiments, the user 105 speaks the audio command to the remote control 107 rather than the media device 104. Thus, the user 105 does not need to be physically proximate to the media device 104 to speak such audio command. Rather, the user 105 needs to only be physically proximate to the remote control 107 to speak audio commands. Such arrangement is advantageous because, for example, the user 105 can be carrying the remote control 107 and issuing audio commands to the media device 104, while in parts of his house not containing the media device 104.

It is noted that, while FIG. 2 is described herein as the user 105 issuing audio commands to the media device 104, this is done solely for illustrative purposes. In other embodiments, the user 105 may instead issue audio commands to any device in multimedia environment 102, such as but not limited to the display device 106.

In some embodiments, the pressing of the talk button 124 begins a listen time period 205 during which time the remote control 107 processes and analyzes audio data received via microphone 126 to recognize audio commands spoken by the user 105 or audibly output by a device in multimedia environment 102 (such as the display device 106 for example). Such processing and analysis of received audio data to recognize audio commands contained therein is sometimes referred to herein as listening for audio commands. The listen time period 205 begins at 204 (when the user 105 presses the talk button 124) and ends X seconds later at 212. X may be 5 or 10 seconds, for example, or any other predetermined time period.

Accordingly, in 206, in response to the talk button 124 being pressed, the remote control 107 may begin listening for audio commands in the audio data received via microphone 126. As part of 206, the remote control 107 may turn on the microphone 126.

In some embodiments, the remote control 107 only listens for audio commands during the listen time period 205, and not outside the listen time period 205. As a result, more accurate and reliable recognition of audio commands is achieved because the remote control 107 knows when the user 105 intends to speak audio commands. Also, because the remote control 107 only listens for audio commands during the listen time period 205, rather than constantly at all times, power consumption is reduced. This is especially important since the remote control 107 may be a battery operated device.

In some embodiments, audio commands may include wake words, as well as commands that follow the wake words. In other embodiments, the pressing of the talk button 124 itself represents the wake word, in which case audio commands refer to the commands that follow the wake word. In other words, the remote control 107 may consider detection of the talk button 124 being pressed as receipt of the wake word.

In 208, the user 105 may speak a command, or a device in the multimedia environment 102 (such as the display device 106) may audibly output a command. This audible command represents audio data.

In 210, the remote control 107 may receive audio data via the microphone 126.

In 212, at the end of the listen time period 205, the remote control 107 may stop listening for audio commands in the received audio data. In other words, at 212, the remote control 107 stops analyzing audio data received via microphone 126 to recognize audio commands contained therein. In some embodiments, at 212, the remote control 107 turns off the microphone 126.

In 214, the remote control 107 may process and analyze the audio data received in 210 to recognize audio commands contained therein. The remote control 107 may perform step 214 locally by using the audio processing module 132, or remotely by sending via the network 134 the received audio data to the audio processing server 136 for processing, or a combination thereof, using any speech recognition process, technique, hardware, software or solution, including but not limited to the examples described in U.S. patent application Ser. No. 15/895,047 titled "Trigger Word Detection With Multiple Digital Assistants," filed Feb. 13, 2018; and U.S. patent application Ser. No. 15/341,552 titled "Improved Reception Of Audio Commands," filed Nov. 2, 2016, which are herein incorporated by reference in their entireties.

In 216, the remote control 107 may audibly output, through speakers 118, the audio commands recognized in step 214. The remote control 107 may take this action to confirm the audio commands with the user 105. (In some embodiments, the remote control 107 may confirm audio commands using other hardware, software, solution, systems, processes and techniques, such as that described in U.S. patent application Ser. No. 15/646,379 titled "Controlling Visual Indicators In An Audio Responsive Electronic Device, and Capturing and Providing Audio Using an API, By Native and Non-Native Computing Devices and Services," filed Jul. 11, 2017, which is herein incorporated by reference in its entirety.)

Figure 3:
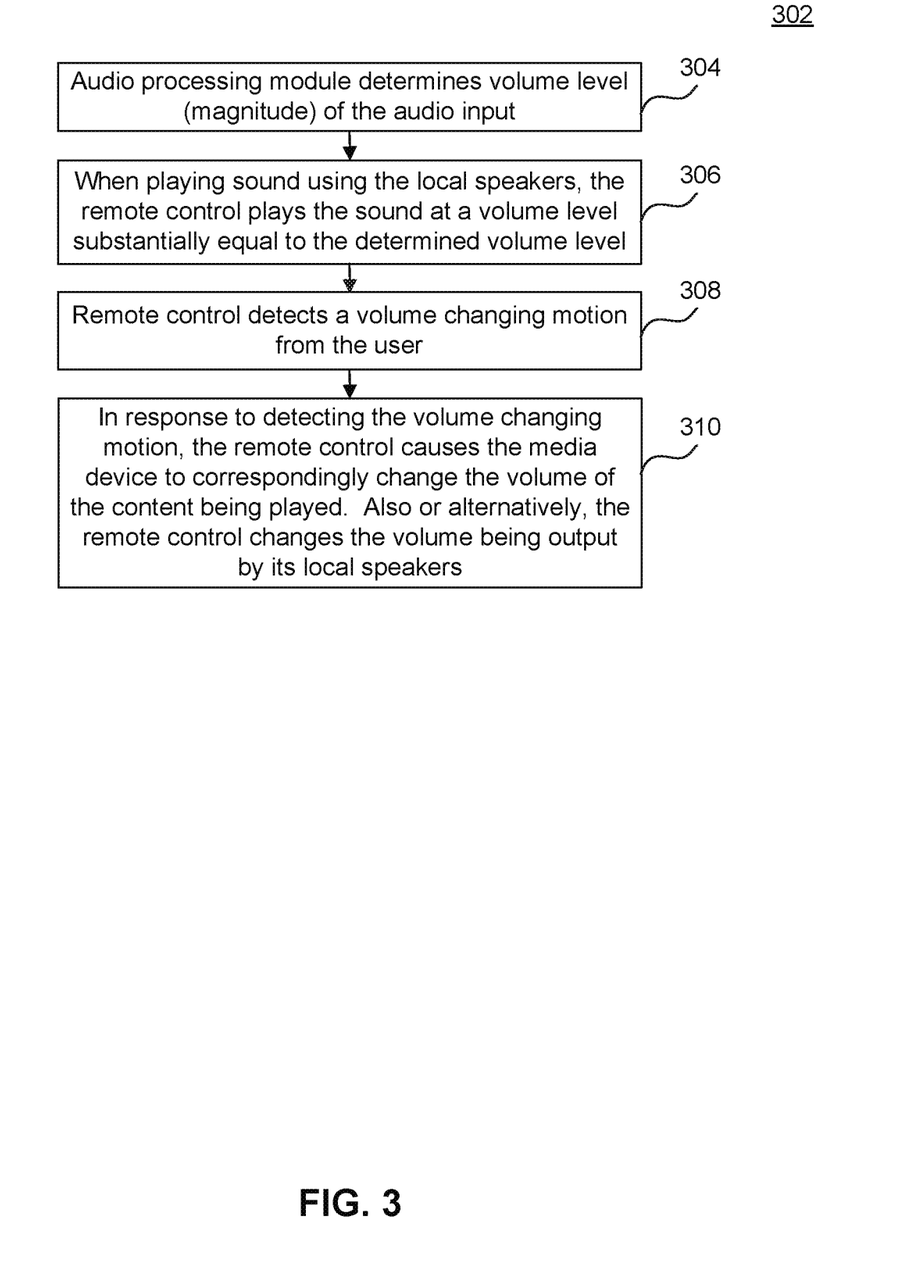
FIG. 3 illustrates a flowchart for changing volume using a smart remote control, according to some embodiments.

In some embodiments, as further discussed below with respect to FIG. 3, when audibly outputting such confirmation messages via speakers 118, the remote control 107 may adjust the volume level of the messages to match the volume level of the audio data received in 210. For example, if the user 105 whispered the command in 208, then the remote control 107 will adjust the volume level of the confirmation message to match the volume level of the whisper. Similarly, if the user 105 spoke the command in a loud voice in 208, then the remote control 107 will adjust the volume level of the confirmation message to match the volume level of the loud voice. In this manner, it is more likely that the remote control 107 will output confirmation message at a volume level suitable for the audible conditions currently existing around the user 105. It is noted that such operation may not be limited to just confirmation messages, but may instead apply to anything output by the remote control 107 via speakers 118, including status messages, administrative messages, content such as music and the audio track of movies and TV programs, etc., as well as any combination or sub-combination thereof.

The remote control 107 may then process the audio commands that were recognized in step 214. Such processing may involve causing the media device 104, display device 106 and/or other devices in multimedia environment 102 to take action consistent with the audio commands. For example, assume that the command spoken in 208 is a request for content, such as music or a movie (this is indicated by 218). Then in this example, the remote control 107 in 220 may request the content from content server(s) 138 via network 134. In some embodiments, the remote control 107 may perform 220 by requesting the content directly from the content server(s) 138. In other embodiments, the remote control 107 may perform 220 by sending a message to the media device 104, to command the media device 104 to request the content from content server(s) 138 via network 134.

In 222, the content server(s) 138 may stream the requested content to the remote control 107 and the media device 104 via the network 134. In other embodiments, the content server(s) 138 may stream the requested content to the remote control 107, and the remote control 107 may then transmit the received content to the media device 104 (and/or other devices in the multimedia environment 102). In these other embodiments, where the remote control 107 has at least two transceivers 122, the remote control 107 may use a first transceiver 122 to receive the content from the content server(s) 138 via the network 134, and may use a second transceiver 122 to transmit the received content to the media device 104. Where the remote control 107 has a single transceiver 122, the remote control 107 may switch the transceiver 122 between receiving the content from the content server(s) 138 via the network 134, and transmitting the received content to the media device 104. In any of these embodiments, buffer memories 116, 128 may be used to store the content for either real-time or on-demand playback.

In 224, the media device 104 may play the received content using the speakers 110. Only the speakers 110 may be needed for playback if the received content is music, for example. If the received content is a movie or TV program, then the display device 106 may also be used for the playback.

In some embodiments, in 226, the remote control 107 may play the received content using the speakers 118. Similar to that discussed above with respect to step 216, the remote control 107 may adjust the volume level of such playback to match the volume level of the audio data received in 210. For example, if the user 105 whispered the command in 208, then the remote control 107 will adjust the volume level of the playback to match the volume level of the whisper.

Similarly, if the user 105 spoke the command in a loud voice in 208, then the remote control 107 will adjust the volume level of the playback to match the volume level of the loud voice. In this manner, it is more likely that the remote control 107 will play the received content at a volume level suitable for the audible conditions currently existing around the user 105 at the time step 226 is performed.

Such operation shall now be described in greater detail with respect to method 302 in FIG. 3. Method 302 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 3, as will be understood by a person of ordinary skill in the art. Method 302 shall be described with reference to FIGS. 1 and 2. However, method 302 is not limited to those example embodiments.

In 304, the audio processing module 132 in the remote control 107 may determine the volume level of audio data received via microphone 126. The audio processing module 132 may perform this function whenever audio data is received via microphone 126, such as during step 210 in FIG. 2.

In 306, whenever audibly outputting sounds over speakers 118, the remote control 107 may adjust the volume level of such sounds to match the volume level determined in 304. Step 306 may be performed during steps 216 and 226 of FIG. 2, for example. The processing of step 306 may apply to all sounds, or just some sounds. For example, the volume level may be adjusted per step 306 when outputting confirmation messages (as in step 216), but not adjusted when playing back content (as in step 226). Instead, in such embodiments, content may be played back at step 226 at a volume level matching the volume level at the media device 104. In some embodiments, the user 105 may indicate the type of messages and/or content where the volume adjustment of step 306 is to be performed.

Some embodiments include methods for using motion of the remote control 107 to change the volume level at the remote control 107 and/or the media device 104. For example, in 308, a volume changing motion of the remote control 107 may be detected. A volume changing motion may be any predefined motion to indicate a desire to change the volume, such as moving the remote control 107 up or down, right or left, forward or back, etc. For example, movement to the right may indicate volume up, whereas movement to the left may indicate volume down. The magnitude of the volume change may be indicated by the extent that the remote control 107 is moved, and/or the speed of the detected motion. For example, the greater or faster the motion, the more the volume is changed, and vice versa. Movements of the remote control 107 as described herein may be detected by motion sensor 130, which may include any mechanism, module, system, software, hardware or solution for detecting motion of the remote control 107.

Accordingly, in 308, the remote control 308 may detect that it has moved by using the motion sensor 130. The remote control 308 then may compare such detected movement to a database of volume changing motions (such database may be stored in buffer 128 or other storage module of the remote control 107), to determine whether the detected movement matches one of the volume changing motions in the database.

If there is a match, then in 310, the remote control 107 may change the volume based on the detected volume changing motion. The volume may be changed at speakers 118 of the remote control 107 and/or the speakers 110 of the media device 104 (as specified by the user 105 via preference settings, for example). To change the volume level of the speakers 110 of the media device 104, the remote control 107 may transmit an appropriate command/message to the media device 104 to take such action.

It is noted that, in large part, the functions and operations were described above as being performed by the remote control 107. However, this disclosure is not limited to that example embodiment. In other embodiments, the functions and operations may be performed by other devices in multimedia environment 102. For example, in some embodiments, the media device 104 may be audio responsive and include a talk button and a microphone, and may perform the functions and operations described above as being performed by the remote control 107.

Example Computer System

Figure 4:
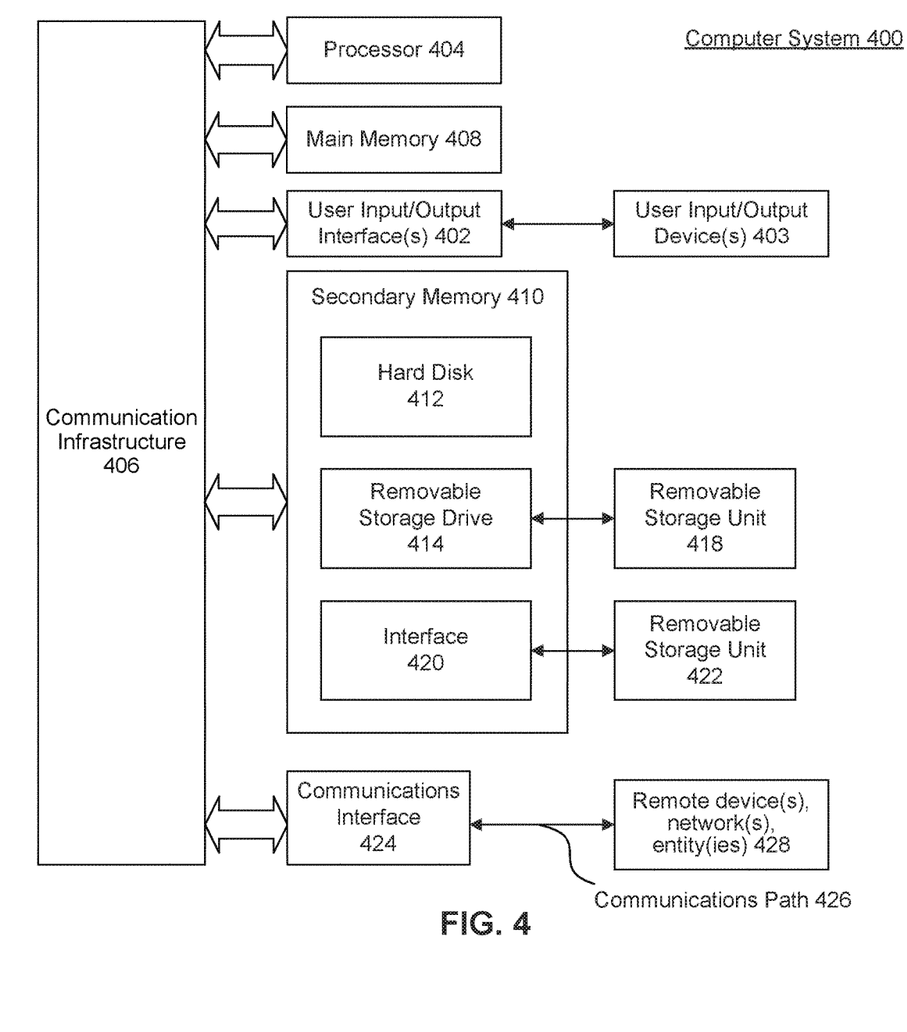
FIG. 4 illustrates an example computer system useful for implementing various embodiments.

Various embodiments and/or components therein can be implemented, for example, using one or more computer systems, such as computer system 400 shown in FIG. 4. Computer system 400 can be any computer or computing device capable of performing the functions described herein. For example, one or more computer systems 400 or portions thereof can be used to implement any embodiments of FIGS. 1-3, and/or any combination or sub-combination thereof, such as the remote control 107 and/or the media device 104.

Computer system 400 includes one or more processors (also called central processing units, or CPUs), such as a processor 404. Processor 404 is connected to a communication infrastructure or bus 406.

One or more processors 404 can each be a graphics processing unit (GPU). In some embodiments, a GPU is a processor that is a specialized electronic circuit designed to process mathematically intensive applications. The GPU can have a parallel structure that is efficient for parallel processing of large blocks of data, such as mathematically intensive data common to computer graphics applications, images, videos, etc.

Computer system 400 also includes user input/output device(s) 403, such as monitors, keyboards, pointing devices, etc., that communicate with communication infrastructure 406 through user input/output interface(s) 402.

Computer system 400 also includes a main or primary memory 408, such as random access memory (RAM). Main memory 408 can include one or more levels of cache. Main memory 408 has stored therein control logic (i.e., computer software) and/or data.

Computer system 400 can also include one or more secondary storage devices or memory 410. Secondary memory 410 can include, for example, a hard disk drive 412 and/or a removable storage device or drive 414. Removable storage drive 414 can be a floppy disk drive, a magnetic tape drive, a compact disk drive, an optical storage device, tape backup device, and/or any other storage device/drive.

Removable storage drive 414 can interact with a removable storage unit 418. Removable storage unit 418 includes a computer usable or readable storage device having stored thereon computer software (control logic) and/or data. Removable storage unit 418 can be a floppy disk, magnetic tape, compact disk, DVD, optical storage disk, and/any other computer data storage device. Removable storage drive 414 reads from and/or writes to removable storage unit 418 in a well-known manner.

According to an exemplary embodiment, secondary memory 410 can include other means, instrumentalities or other approaches for allowing computer programs and/or other instructions and/or data to be accessed by computer system 400. Such means, instrumentalities or other approaches can include, for example, a removable storage unit 422 and an interface 420. Examples of the removable storage unit 422 and the interface 420 can include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 400 can further include a communication or network interface 424. Communication interface 424 enables computer system 400 to communicate and interact with any combination of remote devices, remote networks, remote entities, etc. (individually and collectively referenced by reference number 428). For example, communication interface 424 can allow computer system 400 to communicate with remote devices 428 over communications path 426, which can be wired and/or wireless, and which can include any combination of LANs, WANs, the Internet, etc. Control logic and/or data can be transmitted to and from computer system 400 via communication path 426.

In some embodiments, a non-transitory, tangible apparatus or article of manufacture comprising a tangible computer useable or readable medium having control logic (software) stored thereon is also referred to herein as a computer program product or program storage device. This includes, but is not limited to, computer system 400, main memory 408, secondary memory 410, and removable storage units 418 and 422, as well as tangible articles of manufacture embodying any combination of the foregoing. Such control logic, when executed by one or more data processing devices (such as computer system 400), causes such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 4. In particular, embodiments can operate with software, hardware, and/or operating system implementations other than those described herein.

CONCLUSION

It is to be appreciated that the Detailed Description section, and not the Summary and Abstract sections, is intended to be used to interpret the claims. The Summary and Abstract sections can set forth one or more but not all exemplary embodiments as contemplated by the inventors, and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A battery operated remote control for controlling a media device, comprising:
   a speaker;
   a microphone;
   a talk button; and
   at least one processor configured to:
      detect the talk button being pressed;
      responsive to the detection and within a time period that commences from the detection, analyze audio data received via the microphone to recognize one or more audio commands;
      process the one or more audio commands, wherein the one or more audio commands are associated with content to be played on at least one of the battery operated remote control and the media device;
      determine a volume level of the received audio data;
      cause the content to be played, at a first playback volume, on the at least one of the battery operated remote control and the media device, wherein the first playback volume matches one of a second volume level that matches the volume level or a third volume level that is different from the volume level responsive to a user preference; and
      cause a message confirming receipt of the one or more audio commands to be played, at a second playback volume, wherein the second playback volume matches one of the second volume level or the third volume level, wherein the second playback volume is different from the first playback volume.

2. The battery operated remote control of claim 1, wherein the at least one processor is further configured to:
   audibly confirm the one or more audio commands at the volume level.

3. The battery operated remote control of claim 1, wherein to process the one or more audio commands, the at least one processor is further configured to:
   request the content from a content server; and
   receive the content from the content server.

4. The battery operated remote control of claim 1, wherein the media device is not audio responsive.

5. The battery operated remote control of claim 1, wherein the at least one processor is further configured to:
   turn off the microphone outside the time period.

6. The battery operated remote control of claim 1, wherein the at least one processor is further configured to:
   consider the detection of the talk button being pressed as being receipt of a wake word.

7. The battery operated remote control of claim 1, further comprising a motion sensor, and wherein the at least one processor is further configured to:
   detect motion of the battery operated remote control using the motion sensor;
   determine that the motion corresponds to a volume changing motion; and
   adjust volume of the battery operated remote control and/or the media device according to the volume changing motion.

8. A method in a battery operated remote control for controlling a media device, wherein the battery operated remote control includes a speaker, a microphone and a talk button, the method comprising:
   detecting the talk button being pressed;
   responsive to the detecting and within a time period that commences from the detecting, analyzing audio data received via the microphone to recognize one or more audio commands;
   processing the one or more audio commands, wherein the one or more audio commands are associated with content to be played on at least one of the battery operated remote control and the media device;
   determining a volume level of the audio data;
   causing the content to be played, at a first playback volume, on the at least one of the battery operated remote control and the media device, wherein the first playback volume matches one of a second volume level that matches the volume level or a third volume level that is different from the volume level responsive to a user preference; and
   causing a message confirming receipt of the one or more audio commands to be played, at a second playback volume, wherein the second playback volume matches one of the second volume level or the third volume level, wherein the second playback volume is different from the first playback volume.

9. The method of claim 8, further comprising:
   audibly confirming the one or more audio commands at the volume level.

10. The method of claim 9, wherein the processing comprises:
    requesting the content from a content server; and
    receiving the content from the content server.

11. The method of claim 8, wherein the media device is not audio responsive.

12. The method of claim 8, further comprising:
    turning off the microphone outside the time period.

13. The method of claim 8, further comprising:
    considering the detection of the talk button being pressed as being receipt of a wake word.

14. The method of claim 8, wherein the battery operated remote control further comprises a motion sensor, and wherein the method further comprises:
    detecting motion of the battery operated remote control using the motion sensor;
    determining that the motion corresponds to a volume changing motion; and
    adjusting volume of the battery operated remote control and/or the media device according to the volume changing motion.

15. A non-transitory computer-readable medium having instructions stored thereon that, when executed by at least one computing device, cause the at least one computing device to perform operations comprising:
    detecting a talk button being pressed;
    responsive to the detecting and within a time period that commences from the detecting, analyzing received audio data to recognize one or more audio commands; and
    processing the one or more audio commands, wherein the one or more audio commands are associated with content to be played on at least one of a battery operated remote control and a media device;
    determining a volume level of the audio data;
    causing the content to be played, at a first playback volume, on the at least one of the battery operated remote control and the media device, wherein the first playback volume matches one of a second volume level that matches the volume level or a third volume level that is different from the volume level responsive to a user preference; and
    causing a message confirming receipt of the one or more audio commands to be played, at a second playback volume, wherein the second playback volume matches one of the second volume level or the third volume level, wherein the second playback volume is different from the first playback volume.

16. The non-transitory computer-readable medium of claim 15, the operations further comprising:
    audibly confirming the one or more audio commands at the volume level.

17. The non-transitory computer-readable medium of claim 16, wherein the processing comprises:
    requesting the content from a content server; and
    receiving the content from the content server.

18. The non-transitory computer-readable medium of claim 15, wherein the received audio data is not analyzed to recognize audio commands outside the time period.

19. The non-transitory computer-readable medium of claim 15, the operations further comprising:
    considering the detection of the talk button being pressed as being receipt of a wake word.

20. The non-transitory computer-readable medium of claim 15, the operations further comprising:
    detecting motion of the non-transitory computer-readable medium;
    determining that the motion corresponds to a volume changing motion; and
    adjusting volume of the battery operated remote control and/or the media device according to the volume changing motion.

* * * * *